(12) United States Patent
Yoneda et al.

(10) Patent No.: US 7,427,319 B2
(45) Date of Patent: Sep. 23, 2008

(54) AZO COMPOUND, INK COMPOSITION, AND COLORED OBJECT

(75) Inventors: Takashi Yoneda, Kita-ku (JP); Hiroaki Ohno, Kita-ku (JP); Yasuo Shirasaki, Saitama (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/629,314

(22) PCT Filed: Jun. 21, 2005

(86) PCT No.: PCT/JP2005/011352

§ 371 (c)(1), (2), (4) Date: Dec. 12, 2006

(87) PCT Pub. No.: WO2006/001274

PCT Pub. Date: Jan. 5, 2006

(65) Prior Publication Data

US 2007/0257975 A1 Nov. 8, 2007

(30) Foreign Application Priority Data

Jun. 23, 2004 (JP) ............................. 2004-185434

(51) Int. Cl.
C09D 11/00 (2006.01)
C09D 11/02 (2006.01)
C09B 33/28 (2006.01)
B41J 2/01 (2006.01)

(52) U.S. Cl. .................... 106/31.48; 534/803; 534/806; 347/100

(58) Field of Classification Search .............. 106/31.48; 524/803; 534/806; 347/100
See application file for complete search history.

(56) References Cited

U.S. PATENT DOCUMENTS 4,804,411 A * 2/1989 Eida et al. ................. 106/31.48
6,867,286 B1 * 3/2005 Holloway et al. ........... 534/803

FOREIGN PATENT DOCUMENTS

| JP | 2002-332426 | 11/2002 |
| JP | 2003-73596 | 3/2003 |
| WO | 02/46316 | 6/2002 |
| WO | 2004/007619 | 1/2004 |

OTHER PUBLICATIONS

English translation of JP 2002/332426; Nov. 2002.*
International Search Report dated Sep. 13, 2005.

* cited by examiner

*Primary Examiner*—Helene Klemanski
(74) *Attorney, Agent, or Firm*—Nields & Lemack

(57) ABSTRACT

The present invention relates to an azo compound represented by the following formula (1):

[Chemical Formula 1]

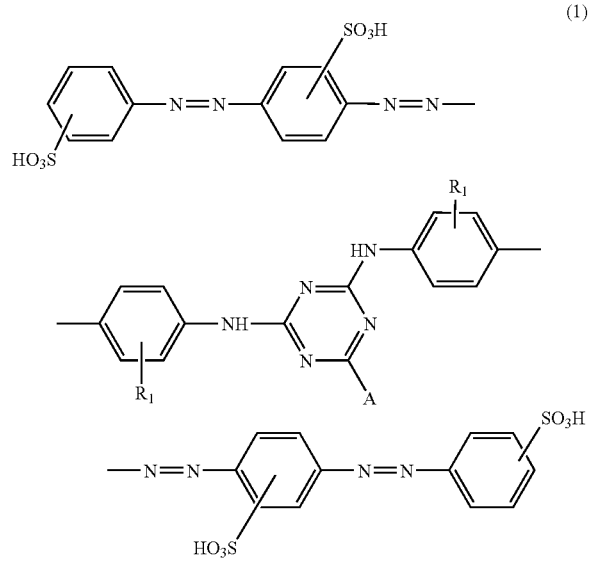

(wherein, in the formula (1), $R_1$ represents a hydrogen atom; a hydroxyl group; a carboxyl group; a ($C_1$-$C_4$)alkyl group which may be substituted by a hydroxyl group or a ($C_1$-$C_4$) alkoxy group; or the like, and A represents an aliphatic amine residue having a carboxyl group or a sulfo group, respectively;) or a salt thereof; an ink composition containing the same; and an inkjet recording method and a colored object using the same. Said azo compound has a high color value and has a hue between yellow and red or a brown hue. The ink containing said azo compound has satisfactory storage stability, and exhibits, when printed therewith, a stable ejection property even on a thermal type inkjet printer, and gives a print of high quality (superior in light fastness, ozone gas fastness and moisture fastness).

21 Claims, No Drawings

AZO COMPOUND, INK COMPOSITION, AND COLORED OBJECT

TECHNICAL FIELD

The present invention relates to a novel azo compound or a salt thereof, an ink composition containing the same and a colored object colored therewith.

BACKGROUND ART

A recording method by an inkjet printer, one of typical methods among various color recording methods, is a method to perform recording by generating an ink droplet and adhering it to a record-receiving material (paper, film and fabric etc.) Since this method is characterized in that the method is calm with less sound produced due to no contact between a recording head and the record-receiving material and that miniaturization and speeding up are easy, the method has been rapidly spreading in recent years, and a big growth is expected in future as well. Conventionally, as an ink for fountain pen and felt pen etc. or an ink for inkjet recording, a water-based ink, in which a water-soluble dye is dissolved in an aqueous medium, had been used. In these water-based inks, generally a water-soluble organic solvent is added to prevent ink clogging at a pen tip or an ink ejection nozzle. In these conventional inks, such requirements as sufficient density of recorded images to be provided, no clogging at a pen tip or a nozzle to occur, good drying property on a record-receiving material, less bleeding, superior storage stability are demanded, and in particular, requirements such as high solubility to water and high solubility to a water-soluble organic solvent to be added to ink are also demanded. Low solubility to water or a water-soluble organic solvent tends to cause a bronzing phenomenon (a phenomenon in which metallic glare appears on the surface of glossy paper due to association of dye, etc.), which lowers printing quality significantly. Further, in an image to be produced, image fastnesses such as water fastness, light fastness, ozone gas fastness and moisture fastness are demanded.

Ozone gas fastness is also referred to as ozone fastness, gas fastness, or the like, and it means a fastness to a phenomenon that ozone gas or the like having oxidizing properties present in the air acts on a dye in a recording paper to cause discoloration or color fading of printed images. Besides the ozone gas, oxidizing gases having such kind of action include NOx, SOx, and the like. However, among these oxidizing gases, the ozone gas has been thought to be a main causative substance, which facilitates more discoloration or color fading of inkjet recorded images. In particular, many photo quality inkjet papers for photographic image quality use a material composed of porous white pigment or the like in an ink receiving layer provided on the surface thereof in order to quicken drying of ink and reduce bleeding in high image quality, and on such recording paper, discoloration or color fading by the ozone gas has been dominantly found. Since the discoloration or color fading phenomenon due to oxidizing gas is peculiar to an inkjet image, improvement of ozone gas fastness has become one of the most important subjects.

To expand the application fields of the printing method using an ink in future, further improvements in water fastness, light fastness, moisture fastness and ozone gas fastness of an ink composition to be used for inkjet recording and colored object colored therewith has been strongly demanded.

Along with the popularization of the inkjet recording method, application fields thereof are expanding as well. Up to now, hues of an ink to be used were generally 3 hues of yellow, magenta and cyan, or 4 hues with additional black, but use of multi-color inks adding red (orange), green or blue hue thereon is being studied. Namely, a challenge to truly reproduce every hue in the natural world is being continued. In order to respond to this challenge, dyes or inks capable of reproducing every hue, brilliance and density have been demanded.

Inks of various hues are prepared from many kinds of dyes. Among them, an ink of black color is an important ink to be used for not only the application printing textual information of achromatic color but also for color images. However, development of a coloring matter providing a good black color, which is neutral in hue both in hyperchromic region and in hypochromic region, has high color density, and shows less light source dependency of hue, has many difficulties in the art, and a coloring matter having sufficient level of performances has yet been scarce, though substantial researches and developments have been implemented. Therefore, an ink of black color is generally formed by blending a variety of plural coloring matters. An ink prepared by blending plural coloring matters has such problems that hue varies depending on media (materials to be recorded) or particularly discoloration becomes more significant by decomposition of coloring matter due to light or ozone gas in comparison with an ink prepared with a single coloring matter. Therefore, a yellow to red dye for color toning to constitute a black to gray achromatic color of high quality. has been demanded.

As a dye for toning a black color dye with a yellow to orange dye similar to coloring matter of the present invention for recording, there is a dye of the following formula (3) described in Patent Literatures 1 and 2, however, a product which satisfies the demands of the market has not been provided.

[Chemical Formula 3]

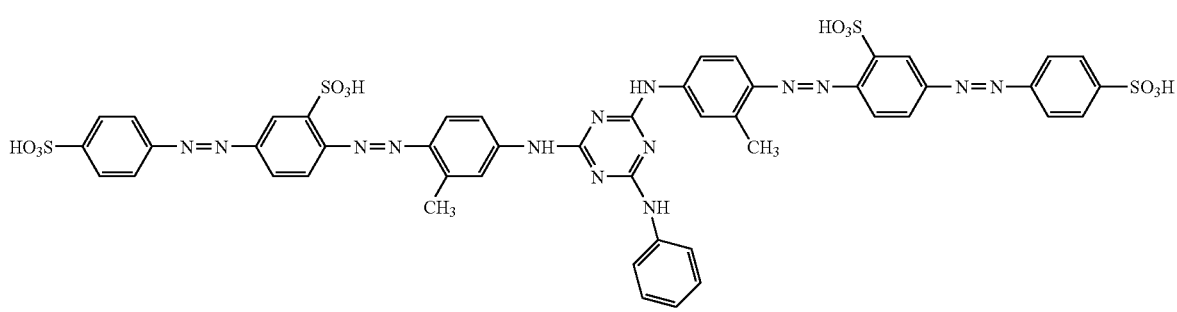

(3)

Patent Literature 1: JP-A-2002-332426
Patent Literature 2: JP-A-2003-73596

DISCLOSURE OF INVENTION

Problem to be Solved by the Invention

The present invention is directed to provide a coloring matter for ink of an azo compound of yellow to red or brown, which has high solubility to a medium containing water as a main component, is stable even when a high concentration of aqueous dye solution and an ink are stored for a long period of time, takes on neutral gray to black with no other color by blending with a coloring matter for black color, is superior in printing aptitude on an inkjet printer, gives high density of printed images without showing bronzing, provides printed images superior in fastness of printed images, in particular, superior in ozone gas fastness, and is easy in synthesis, and an ink composition containing the same.

Means for Solving the Problem

The inventors of the present invention has, after intensively studying a way to solve the above problem, found that a specified azo compound can solve the above problem, and accomplished the present invention.

Thus, the present invention relates to:

(1) An azo compound represented by the following formula (1):

[Chemical Formula 1]

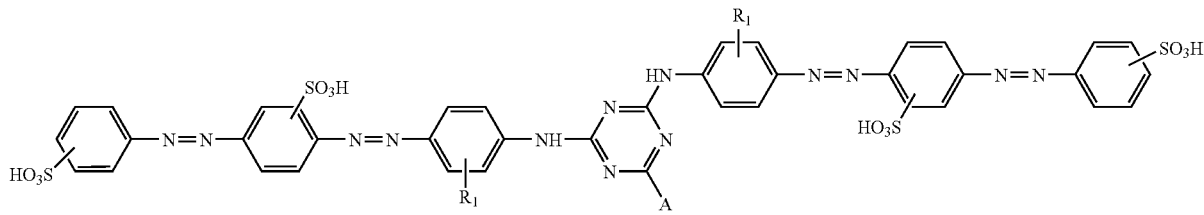

(1)

(wherein, in the formula (1), $R_1$ represents a hydrogen atom; a hydroxyl group; a carboxyl group; a $(C_1-C_4)$alkyl group which may be substituted by a hydroxyl group or a $(C_1-C_4)$alkoxy group; a $(C_1-C_4)$alkoxy group which may be substituted by a hydroxyl group or a $(C_1-C_4)$alkoxy group; a $(C_1-C_4)$alkylamino group which may be substituted by a hydroxyl group or a $(C_1-C_4)$alkoxy group; a carboxy$(C_1-C_5)$alkylamino group; a bis{carboxy$(C_1-C_5)$alkyl}amino group; a $(C_1-C_4)$alkanoylamino group which may be substituted by a hydroxyl group or a $(C_1-C_4)$alkoxy group; a phenylamino group which may be substituted by a carboxyl group, a sulfonic acid group or an amino group; a sulfo group; a halogen atom; or a ureide group, and A represents an aliphatic amine residue having a carboxyl group or a sulfo group, respectively;)

or a salt thereof;

(2) The azo compound according to the above (1) represented by the following formula (2):

[Chemical Formula 2]

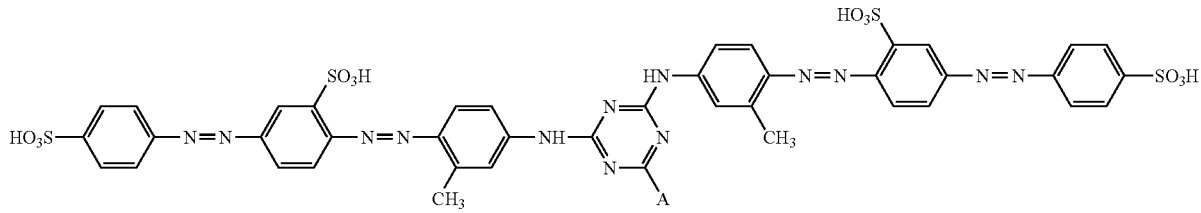

(2)

(wherein, in the formula (2), A represents the same meaning as in the formula (1);)

or a salt thereof;

(3) The azo compound according to (1) or (2), wherein, in the formula (1) in (1) or in the formula (2) in (2), A is a mono($C_1$-$C_5$)alkylamino group or a di($C_1$-$C_5$)alkylamino group which has a carboxyl group or a sulfo group; or a salt thereof;

(4) The azo compound according to (1) or (2), wherein, in the formula (1) in (1) or in the formula (2) in (2), A is a mono($C_1$-$C_2$)alkylamino group or a di($C_1$-$C_2$)alkylamino group which has a carboxyl group or a sulfo group; or a salt thereof;

(5) The azo compound according to (2), wherein A in the formula (2) is sulfoethylamino group, or a salt thereof;

(6) The azo compound according to (2), wherein A in the formula (2) is a group selected from the group consisting of a mono- or di(carboxymethyl)amino group and a mono- or di(carboxyethyl)amino group, or a salt thereof;

(7) An ink composition characterized by comprising the azo compound according to any one of (1) to (6) or a salt thereof;

(8) An ink composition characterized by comprising the azo compound according to any one of (1) to (6) or salt thereof and a coloring matter for black color;

(9) The ink composition according to (7) or (8) comprising a water-soluble organic solvent;

(10) The ink composition according to any one of (7) to (9), wherein the ink composition is for inkjet recording;

(11) An inkjet recording method, characterized by that the ink composition according to any one of (7) to (10) is used as an ink in the inkjet recording method wherein recording is performed on a record-receiving material by ejecting an ink drop responding to recording signal;

(12) The inkjet recording method according to (11), wherein the record-receiving material is a sheet for communication;

(13) The inkjet recording method according to (12), wherein the sheet for communication comprises a porous white inorganic substance;

(14) An inkjet printer loaded with a container containing the ink composition according to any one of (7) to (10);

(15) A colored object colored with the azo compound or a salt thereof according to any one of (1) to (6).

Effect of the Invention

Since the azo compound of the present invention or salt thereof (hereinafter, simply referred to as "azo compound" including salt thereof) is superior in solubility to water, filtration property with a membrane filter in a process to prepare the ink composition is good, and the azo compound is also superior in storage stability or ejection stability in the recording liquid. Further, the ink composition of the present invention containing this azo compound has good storage stability without exhibiting crystal deposition, change in physical properties nor change in color or the like after storage for a long period of time. Still further, the ink composition containing the azo compound of the present invention is used for inkjet recording and for writing instrument, in particular, when recording is carried out on a plain paper or an inkjet paper, shows stable ejection property in an inkjet printer for a long period of time, exhibits high printing density of recorded images, and does not give rise to bronzing even on glossy paper to be used for photograph recording. Furthermore, the ink composition of the present invention containing this azo compound allows full color inkjet recording with a wide color range superior in various fastnesses by using together with magenta, cyan and yellow dyes superior in various fastnesses, in particular, in ozone gas fastness. Thus, the azo compound of the present invention is useful as a coloring matter giving a wide range of yellow to red hue, or a coloring matter for adjusting color tone (a coloring matter for color toning).

BEST MODE FOR CARRYING OUT THE INVENTION

Hereinafter, the present invention will be explained in detail.

In the compound of the formula (1) of the present invention, $R_1$ represents a hydrogen atom; a hydroxyl group; a carboxyl group; a ($C_1$-$C_4$)alkyl group which may be substituted by a hydroxyl group or a ($C_1$-$C_4$)alkoxy group; a ($C_1$-$C_4$)alkoxy group which may be substituted by a hydroxyl group or a ($C_1$-$C_4$)alkoxy group; a ($C_1$-$C_4$)alkylamino group which may be substituted by a hydroxyl group or a ($C_1$-$C_4$)alkoxy group; a carboxy($C_1$-$C_5$)alkylamino group; a bis-{carboxy($C_1$-$C_5$)alkyl}amino group; a ($C_1$-$C_4$)alkanoylamino group which may be substituted by a hydroxyl group or a ($C_1$-$C_4$)alkoxy group; a phenylamino group whose phenyl group may be substituted by a carboxyl group, a sulfo group or an amino group; a sulfo group; a halogen atom; or a ureide group.

Specific examples of a ($C_1$-$C_4$)alkyl group which may be substituted by a hydroxyl group or a ($C_1$-$C_4$)alkoxy group include methyl, ethyl, n-propyl, isopropyl, n-butyl, isobutyl, sec-butyl, tert-butyl, methoxyethyl, ethoxyethyl, n-propoxyethyl, isopropoxyethyl, n-butoxyethyl, sec-butoxyethyl, tert-butoxyethyl, 2-hydroxyethyl, and the like.

Also, examples of a ($C_1$-$C_4$)alkoxy group which may be substituted by a hydroxyl group or a ($C_1$-$C_4$)alkoxy group include methoxy, ethoxy, n-propoxy, isopropoxy, n-butoxy, sec-butoxy, tert-butoxy, 2-hydroxyethoxy, 2-hydroxypropoxy, 3-hydroxypropoxy, methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy, n-propoxybutoxy, 2-hydroxyethoxyethoxy, and the like.

Further, examples of a ($C_1$-$C_4$)alkylamino group which may be substituted by a hydroxyl group or a ($C_1$-$C_4$)alkoxy group include methylamino, ethylamino, n-propylamino, isopropylamino, n-butylamino, isobutylamino, N,N-dimethylamino, N,N-diethylamino, N,N-di(n-propylamino), N,N-di(isopropyl)amino, hydroxyethylamino, 2-hydroxypropylamino, 3-hydroxypropylamino, bis(hydroxyethyl)amino, methoxyethylamino, ethoxyethylamino, bis(metoxyethyl) amino, bis(2-ethoxyethyl)amino, and the like.

Further, examples of a carboxy($C_1$-$C_5$)alkylamino group include carboxymethylamino, carboxyethylamino, carboxypropylamino, carboxy-n-butylamino, carboxy-n-pentylamino, and the like.

Further, examples of a bis{carboxy ($C_1$-$C_5$)alkyl}amino group include bis(carboxymethyl)amino, bis(carboxyethyl)amino, bis(carboxypropyl)amino, and the like.

Further, examples of a ($C_1$-$C_4$)alkanoylamino group which may be substituted by a hydroxyl group or a ($C_1$-$C_4$)alkoxy group include acetylamino, n-propionylamino, isopropionylamino, hydroxyacetylamino, 2-hydroxy-n-propionylamino, 3-hydroxy-n-propionylamino, 2-methoxy-n-propionylamino, 3-methoxy-n-propionylamino, 2-hydroxy-n-butyrylamino, 3-hydroxy-n-butyrylamino, 2-methoxy-n-butyrylamino, 3-methoxy-n-butyrylamino, and the like.

Further, examples of a phenylamino group whose phenyl group may be substituted by a carboxyl group, a sulfo group or an amino group include phenylamino, sulfophenylamino, carboxyphenylamino, biscarboxyphenylamino, aminophenylamino, diaminophenylamino, diaminosulfophenylamino, and the like.

Preferable $R_1$ is a ($C_1$-$C_4$)alkyl group, and particularly preferable one is a methyl group.

A is an aliphatic amine residue having a carboxyl group or a sulfo group, preferably a ($C_1$-$C_5$)aliphatic amine residue, and includes a mono($C_1$-$C_5$)alkylamino group or a di($C_1$-$C_5$) alkylamino group having a carboxyl group or a sulfo group such as a sulfo($C_1$-$C_5$)alkylamino group, a di{sulfo($C_1$-$C_5$) alkyl}amino group, a carboxyl($C_1$-$C_5$)alkylamino group, and a di{carboxyl($C_1$-$C_5$)alkyl}amino group. More preferable is an aliphatic having 1 or 2 carbon atoms, and further preferable is a sulfoethylamino group, a mono- or di(carboxylethyl) amino group and a mono- or di(carboxymethyl)amino group, and most preferable is a sulfoethylamino group.

The compounds represented by the above formula (1) and (2) exist in a form of free acid or salt thereof. In the present invention, salt includes a salt of an inorganic or an organic cation. Among them, specific examples of inorganic salt include alkali metal salt and ammonium salt, and preferable inorganic salt includes salt of lithium, sodium or potassium, and ammonium salt, and salt with an organic cation includes, but is not limited to, for example, a salt with a compound represented by the general formula (4).

[Chemical Formula 4]

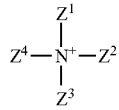

(4)

In the general formula (4), each of $Z^1$, $Z^2$, $Z^3$ and $Z^4$ independently represents a hydrogen atom, an alkyl group, a hydroxyl($C_1$-$C_4$)alkyl group or a hydroxyl($C_1$-$C_4$)alkoxy ($C_1$-$C_4$)alkyl group. An alkyl group is not particularly limited but has generally around 1 to 20 carbon atoms, preferably around 1 to 10 carbon atoms.

The azo compound of the present invention represented by the general formula (1) can be synthesized, for example, by the following process. In this connection, a structural formula of a compound in each step is represented in free acid form. Namely, a compound represented by the formula (5):

[Chemical Formula 5]

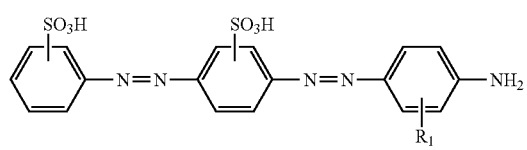

(5)

is reacted with cyanuric chloride to obtain a compound represented by the formula (6):

[Chemical Formula 6]

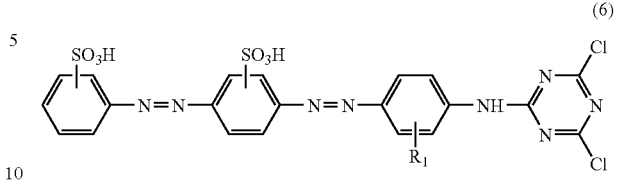

(6)

This compound is further subjected to a condensation reaction again with the compound represented by the above formula (5) to obtain a compound represented by the formula (7):

[Chemical Formula 7]

(7)

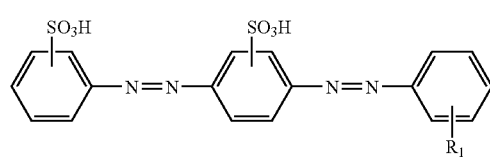

Subsequently, this compound is condensed with an aliphatic amine (A-H) having a carboxyl group or a sulfo group to obtain the compound represented by the above formula (1). Here, in the above, $R_1$ and A represent the same meanings as in the above formula (1), respectively.

Suitable example of the aliphatic amine residue having a carboxyl group or a sulfo group is not particularly limited, but specifically includes those having structures shown in the following Table 1.

TABLE 1

| No. | Aliphatic amine residue |
|---|---|
| 1 | $NH(CH_2)_2SO_3H$ |
| 2 | $N((CH_2)_3COOH)_2$ |
| 3 | $NH(CH_2)_2COOH$ |
| 4 | $NH(CH_2)_5COOH$ |
| 5 | $NH(CH_2SO_3H)$ |
| 6 | $N(CH_2SO_3H)_2$ |
| 7 | $N((CH_2)_2SO_3H)_2$ |
| 8 | $NH(CH_2COOH)$ |
| 9 | $N(CH_2COOH)_2$ |
| 10 | $N((CH_2)_2COOH)_2$ |
| 11 | $NH(CH_2)_3SO_3H$ |
| 12 | $N((CH_2)_3SO_3H)_2$ |

The reaction of the compound of the formula (5) with cyanuric chloride (primary condensation) is executed under the well known conditions per se. For example, said reaction is executed in an aqueous or an organic medium, for example, at a temperature of 0 to 40° C., preferably 0 to 30° C., and at a pH of 1 to 7, preferably 3 to 7. In the reaction of the compound of the formula (5) with cyanuric chloride, both reactants are used roughly in stoichiometric amounts.

The reaction of the compound of the formula (5) with the compound of the formula (6) (secondary condensation) is also executed under the well known conditions per se. For example, said reaction is executed in an aqueous or an organic medium, for example, at a temperature of 10 to 60° C., preferably 20 to 45° C., and at a pH of 3 to 10, preferably 6 to 8.

In the reaction of the compound of the formula (5) with the compound of the formula (6), both reactants are used roughly in stoichiometric amounts.

The reaction of the compound of the formula (6) with the aliphatic amine having a carboxyl group or a sulfo group is also executed under the well known conditions per se. For example, said reaction is executed in an aqueous or an organic medium, for example, at a temperature of 30 to 100° C., preferably 50 to 95° C., and at a pH of 5 to 13, preferably 6 to 11.

The azo compound represented by the general formula (1) and (2) according to the present invention can be isolated as a form of free acid by adding mineral acid after completion of the coupling reaction, and inorganic salt can be removed therefrom by washing with water or acidified water. Next, the resultant acid type coloring matter having a low salt content can be converted to a solution of a corresponding salt by neutralizing with a desired inorganic or organic base in an aqueous medium. Examples of the inorganic base include, but is not limited to, for example, hydroxides of alkali metals such as lithium hydroxide, sodium hydroxide and potassium hydroxide; ammonium hydroxide; or carbonates of alkali metals such as lithium carbonate, sodium carbonate and potassium carbonate, and examples of the organic base include, but is not limited to, for example, salts of the organic amine represented by the above formula (4), for example, alkanolamines such as diethanolamine and triethanolamine.

The azo compound of the present invention represented by the above general formula (1) or (2) is capable of dyeing a material consisting of cellulose, by preparing an aqueous composition containing the compound. In addition, the compound is also capable of dyeing other materials containing carbonamide bond, and can be widely used for dyeing leathers, fabrics and papers. Further, preferable use of the compound of the present invention includes an ink composition. Ink composition can be prepared by dissolving the compound of the present invention in a liquid medium.

The reaction liquid containing the azo compound of the present invention represented by the above general formula (1) or (2) can be directly used for producing an ink composition. Alternatively, firstly, the reaction liquid is dried, for example, spray drying to isolate the azo compound; or salting out with an inorganic salt such as sodium chloride, potassium chloride, calcium chloride and sodium sulfate, or aciding out with a mineral acid such as hydrochloric acid, sulfuric acid or nitric acid, or acid salting out by combining the above salting out and aciding out is carried out to isolate the azo compound, then an ink composition can be prepared using the azo compound.

The ink composition of the present invention is a composition containing the azo compound of the present invention represented by the general formula (1), preferably by the general formula (2) of generally 0.1 to 20% by mass, preferably 1 to 10% by mass, and more preferably 2 to 8% by mass, and water as a main medium.

Further, the azo compound can be used in combination with a coloring matter for black color, to prepare an ink composition for black color. The coloring matter for black color to be used in combination is a coloring matter for preparing a black color ink composition, of which hue is black tinged with blue to green, and is not particularly limited but preferably a coloring matter which is superior in various properties required for ink such as water fastness, light fastness, moisture fastness and ozone gas fastness. Alternatively, the coloring matter for black color may be prepared by blending coloring matters having other hues such as yellow, magenta, cyan and other hues.

A guide for a blending ratio of the azo compound of the present invention and the coloring matter for black color depends on the hue of the coloring matter for black color, but the azo compound of the present invention is, for example, 1 to 50% by mass, preferably 10 to 40% by mass, based on the total mass of all coloring matters blended.

The ink composition of the present invention may further contain 0 to 30% by mass of a water-soluble organic solvent and 0 to 5% by mass of ink modifier(s). Further, pH of the ink composition is preferably 5 to 11, and more preferably 7 to 9, in view of improved storage stability. Also, surface tension of the ink composition is preferably 25 to 70 mN/m, and more preferably 25 to 60 mN/m. Further, viscosity of the ink composition is preferably not more than 30 mPa·s, and more preferably not more than 20 mPa·s.

The ink composition of the present invention is prepared by dissolving the azo compound represented by the above general formula (1), preferably general formula (2) in water and/or a water-soluble organic solvent (water-miscible organic solvent), and, if necessary, by adding ink modifier(s) thereto. When this ink composition is used as an ink for inkjet printer, as the compound of the present invention, the compound containing less amount of inorganic substance such as chlorides and sulfates of metal cation are preferably used. A guide for the content is, for example, not more than around 1% by mass (based on whole amount of the coloring matter). In order to produce the compound of the present invention containing less inorganic substance, desalinating treatment may be employed, for example, by a common method using a reverse osmosis membrane or by a method that a dry product or a wet cake of the compound of the present invention is stirred in a mixed solvents of an alcohol such as methanol and water, and then filtered and dried, or the like.

The water-soluble organic solvent to be used in the preparation of the above ink composition includes, for example, ($C_1$-$C_4$)alkanol such as methanol, ethanol, propanol, isopropanol, butanol, isobutanol, sec-butanol, tert-butanol; carboxylic acid amide such as N,N-dimethylformamide and N,N-dimethylacetamide; lactam such as 2-pyrrolidone and N-methylpyrrolidine-2-one; cyclic urea such as 1,3-dimethylimidazolidine-2-one and 1,3-dimethylhexahydropyrimid-2-one; ketone or ketoalcohol such as acetone, methyl ethyl ketone and 2-methyl-2-hydroxypentane-4-one; cyclic ether such as tetrahydrofuran and dioxane; monomer, oligomer or polyalkylene glycol having ($C_2$-$C_6$)alkylene unit or thioglycol such as ethylene glycol, 1,2-propylene glycol, 1,3-propylene glycol, 1,2-butylene glycol, 1,4-butylene glycol, 1,6-hexylene glycol, diethylene glycol, triethylene glycol, tetraethylene glycol, dipropylene glycol, polyethylene glycol, polypropylene glycol, thiodiglycol and dithiodiglycol; polyol(triol) such as glycerin, hexane-1,2,6-triol; ($C_1$-$C_4$) alkylether of polyhydric alcohol such as ethylene glycol monomethylether or ethylene glycol monoethylether, diethylene glycol monomethylether or diethylene glycol monoethylether, or triethylene glycol monomethylether or triethylene glycol monoethylether; γ-butyrolactone; or dimethylsulfoxide. These organic solvents may be used alone or in combination of two or more kinds.

The ink modifier to be used in the preparation of the above ink composition includes, for example, fungicide, antiseptic agent, pH modifier, chelating agent, rust-preventive agent, water-soluble UV absorbing agent, water-soluble polymer compound, dye dissolving agent, antioxidant, surfactant, and the like.

The fungicide which can be used includes, for example, sodium dehydroacetate, sodium benzoate, sodium pyridinethion-1-oxide, ethyl p-hydroxybenzoate, 1,2-benzisothiazolin-3-one and a salt thereof. These compounds are preferably used in an amount of 0.02 to 1.00% by mass in the ink composition.

The antiseptic agent which can be used includes, for example, compounds of organic sulfur type, organic nitrogen sulfur type, organic halogen type, haloarylsulfone type, iodopropargyl type, N-haloalkylthio type, benzothiazole type, nitrile type, pyridine type, 8-oxyquinoline type, isothiazoline type, dithiol type, pyridine oxide type, nitropropane type, organic tin type, phenol type, quaternary ammonium salt type, triazine type, thiazine type, anilide type, adamantane type, dithiocarbamate type, brominated indanone type, benzyl bromoacetate type and inorganic salt type. Organic halogen type compound includes, for example, sodium pentachlorophenol. Pyridine oxide type compound includes, for example, sodium 2-pyridinethiol-1-oxide. Inorganic salt type compound includes, for example, anhydrous sodium acetate. Isothiazoline type compound includes, for example, 1,2-benzisothiazoline-3-one, 2-n-octyl-4-isothiazoline-3-one, 5-chloro-2-methyl-4-isothiazoline-3-one, 5-chloro-2-methyl-4-isothiazoline-3-one magnesium chloride, 5-chloro-2-methyl-4-isothiazoline-3-one calcium chloride, 2-methyl-4-isothiazoline-3-one calcium chloride, or the like. Other antiseptic agent includes sodium sorbate, sodium benzoate, or the like.

As the pH modifier, any substance can be used so long as the substance can control pH of the ink within a range from 5 to 11 without giving any adverse effect to the ink to be prepared. Examples of such substance include, for example, alkanolamines such as diethanolamine, triethanolamine and N-methyldiethanolamine; hydroxides of alkali metals such as lithium hydroxide, sodium hydroxide and potassium hydroxide; ammonium hydroxide (ammonia); carbonates of alkali metals such as lithium carbonate, sodium carbonate, sodium hydrogen carbonate and potassium carbonate; and inorganic bases such as potassium acetate, sodium silicate, disodium phosphate, and the like.

The chelating agent which can be used includes, for example, sodium ethylenediamine tetraacetate, sodium nitrilotriacetate, sodium hydroxylethylethylenediamine triacetate, sodium diethylenetriamine pentaacetate, sodium uracil diacetate, or the like.

The rust-preventive agent which can be used includes, for example, acidic sulfite salts, sodium thiosulfate, ammonium thioglycollate, diisopropylammonium nitrite, pentaerythritol tetranitrate, dicyclohexylammonium nitrite, or the like.

The water-soluble UV absorbing agent which can be used includes, for example, sulfonated benzophenone type compound, benzotriazole type compound, salicylic acid type compound, cinnamic acid type compound and triazine type compound.

Examples of the water-soluble polymer compound which can be used include, for example, polyvinyl alcohol, cellulose derivatives, polyamines, polyimines, and the like.

Examples of the dye dissolving agent which can be used include, for example, $\epsilon$-caprolactam, ethylene carbonate, urea, and the like.

As the antioxidant which can be used, for example, various types of organic type and metal complex type of color fading inhibitors can be used. The above organic type color fading inhibitor includes hydroquinones, alkoxyphenols, dialkoxyphenols, phenoles, anilines, amines, indanes, chromans, alkoxyanilines, heterocycles and the like.

Examples of the surfactant which can be used include, for example, well-known surfactants such as anion type, cation type and nonion type. The anionic surfactant includes alkyl sulfonic acid, alkyl carboxylate, α-olefin sulfonate, polyoxyethylene alkylether acetate, N-acylamino acid and salt thereof, N-acylmethyltaurine salt, alkylsulfate polyoxyalkylether sulfate, alkylsulfate polyoxyethylene alkylether phosphate, rosin acid soap, castor oil sulfate, lauryl alcohol sulfate, alkylphenol type phosphate, alkyl type phosphate, alkyl arylsulfonate, diethyl sulfosuccinate and salt thereof, diethylhexyl sulfosuccinate, dioctyl sulfosuccinate, and the like. The cationic surfactant includes 2-vinylpyridine derivatives, poly(4-vinylpyridine) derivatives, and the like. The amphoteric surfactant includes lauryldimethylaminoacetic acid betaine, 2-alkyl-N-carboxymethyl-N-hydroxyethylimidazolinium betaine, coconut oil fatty acid amide propyldimethylaminoacetic acid betaine, polyoctylpolyaminoethylglycin, and other imidazoline derivatives and the like. The nonionic surfactant includes ether type such as polyoxyethylene nonylphenyl ether, polyoxyethylene octylphenyl ether, polyoxyethylene dodecylphenyl ether, polyoxyethylene oleyl ether, polyoxyethylene lauryl ether, polyoxyethylene alkylether; ester type such as polyoxyethylene oleic acid, polyoxyethylene oleate, polyoxyethylene distearate, sorbitan laurate, sorbitan monostearate, sorbitan monooleate, sorbitan sesquioleate, polyoxyethylene monooleate and polyoxyethylene stearate; acetylene glycol type such as 2,4,7,9-tetramethyl-5-decyne-4,7-diol, 3,6-dimethyl-4-octyne-3,6-diol and 3,5-dimethyl-1-hexyne-3-ol (for example, Surfynol(trade name)-104, 105, 82, 465 or Olfin (trade name)-STG: made by Nissin Chemical Industry Co., Ltd.). These ink modifiers may be used alone or in mixture.

The ink composition of the present invention can be obtained by mixing each of the above components in any order and stirring. The resultant ink composition may be filtered using a membrane filter or the like to remove impurities, if necessary.

The ink composition of the present invention can be used in the various fields, and is suitable to water-based ink for writing, water-based printing ink, information recording ink and the like. The ink composition is particularly preferably used as an inkjet ink containing said ink composition, and suitably used in the method of inkjet recording of the present invention as described later.

Next, the inkjet recording method of the present invention will be explained. The inkjet recording method of the present invention is characterized in that recording is performed by using an ink for inkjet containing the above ink composition. In the inkjet recording method of the present invention, though recording is performed on a record-receiving material by using an ink for inkjet containing the above ink composition. Ink nozzle, etc. to be used in the method are not particularly limited and can be selected as appropriate depending on the purpose, and known methods can be used, such as electric charge controlling method where ink is ejected utilizing electrostatic induction force; drop on demand method (pressure pulse method) utilizing oscillating pressure of a piezo element; acoustic inkjet method where ink is ejected utilizing radiation pressure by irradiating acoustic beam converted from electric signal to ink; thermal inkjet (BUBBLE JET (trade mark)) method utilizing pressure of a bubble generated by heating ink; and the like. In addition, the above inkjet recording method also includes a method where an ink having low concentration called as photo ink is ejected in many droplets of small volume; a method to improve image quality using plural inks which are substantially same in hue but different in concentration; and a method using a colorless transparent ink.

The colored object of the present invention is a record-receiving material which is colored with the compound of the present invention or the ink composition containing the same, more preferably, which is colored using the ink composition of the present invention by an inkjet printer. Materials to be colored include, for example, sheet for communication such as paper and film; fiber and fabric (cellulose, nylon, wool and the like); leather and substrate for color filter. The sheet for communication is preferably surface treated sheet, more specifically, a substrate material such as paper, synthetic paper and film provided with an ink receiving layer thereon. The ink receiving layer is provided, for example, by impregnating into or coating a cationic polymer on the above substrate material, or by coating a porous white inorganic substance, which can absorb coloring matter in ink, such as porous silica, alumina sol or special ceramic, together with a hydrophilic polymer such as polyvinyl alcohol or polyvinyl pyrrolidone on the above substrate surface. Such papers provided with an ink receiving layer is usually referred to as inkjet paper (film) or glossy paper (film), and PICTRICO (made by Asahi Glass Co., Ltd.), Professional Photo Paper PR-101, Super Photo Paper and Matte Photo Paper (all made by Canon Inc.), PM Photo Paper (glossy) and PM Matt Paper (all made by Seiko Epson Corp.), Premium Plus Photo Paper, Premium Glossy Film and Photo Paper (all made by Hewlett-Packard Dev. Co.) and Photolike QP (made by Konica Minolta) are commercially available. In addition, plain paper can be naturally utilized too.

The azo compound of the present invention is superior in solubility to water, and the ink composition of the present invention containing the present azo compound has superior storage stability without causing crystal deposition, change in physical properties, change in color, or the like after storage for a long period of time. Further, the ink liquid for recording containing the azo compound of the present invention is used for inkjet recording and for writing instrument, and provides, in particular, stable ejection property required for the thermal inkjet method without exhibiting a problem thought to be a burning phenomenon. In addition, when recording carried out on a plain paper or an inkjet paper, the printed matter does not exhibit bronzing, has high print density, and further is superior in ozone gas fastness, light fastness and moisture fastness.

Hereinafter, the present invention will be explained more specifically by means of Examples, but the present invention is by no means limited by the following Examples. In this connection, "parts" and "%" used herein mean "parts by mass" and "% by mass", respectively, unless otherwise noted.

EXAMPLE 1

Into 600 parts of water, 14.3 parts of a compound represented by the formula (8) was added. The resultant solution was adjusted to pH=6.0 to 7.0 with liquid caustic soda, and 6.1 parts of cyanuric chloride was added thereto at 10 to 20° C. After the addition, the solution was stirred for 2 hours while maintaining at pH=6.0 to 7.5 with sodium carbonate, to obtain a solution containing a compound of the formula (9).

[Chemical Formula 8]

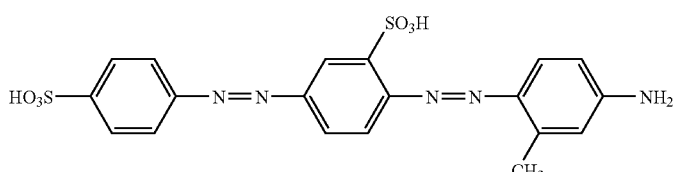

(8)

[Chemical Formula 9]

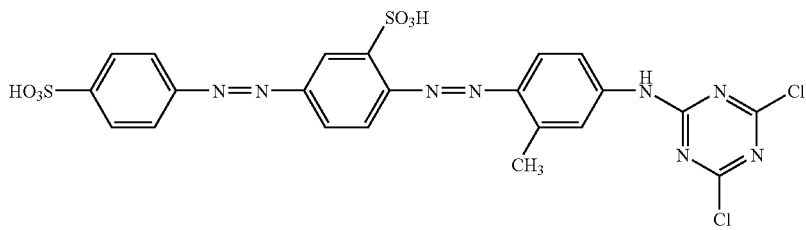

(9)

The solution was warmed up to 30 to 40° C., and 17.1 parts of the compound of the formula (8) was added thereto. After the addition, the solution was stirred for 3 hours while maintaining at pH=7.0 to 8.5 with sodium carbonate, to obtain a solution containing a compound of the formula (10).

[Chemical Formula 10]

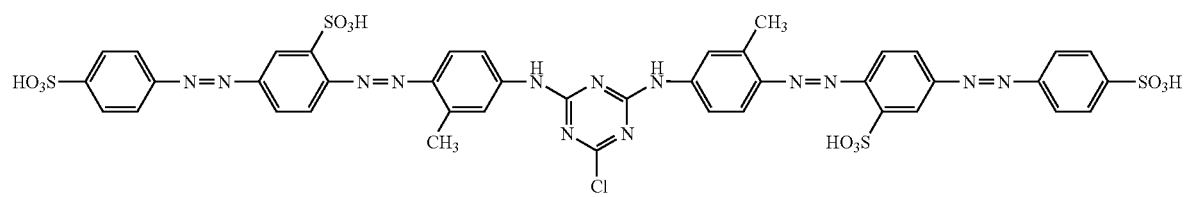

(10)

The solution was heated up to 80 to 95° C., and 5.0 parts of taurine was added thereto. After the addition, the solution was stirred for 6 hours while maintaining at pH=9.0 to 10.0, then salted out with sodium chloride, and filtered. The whole amount of the resultant cake was dissolved in 300 parts of water, and desalinated by crystallizing with 600 parts of 2-propanol, then dried to obtain 30.1 parts of a compound of the formula (11) of the present invention. The maximum absorption wavelength in water of the compound was 437 nm.

[Chemical Formula 11]

(11)

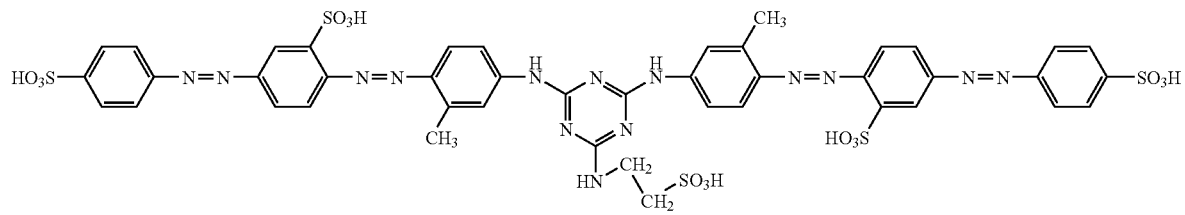

EXAMPLE 2

In the same manner as in Example 1 except that 12.5 parts of iminodiacetic acid was used instead of 5.0 parts of taurine, 31.0 parts of a compound of the formula (12) of the present invention was obtained. The maximum absorption wavelength in water of the compound was 436 nm.

[Chemical Formula 12]

(12)

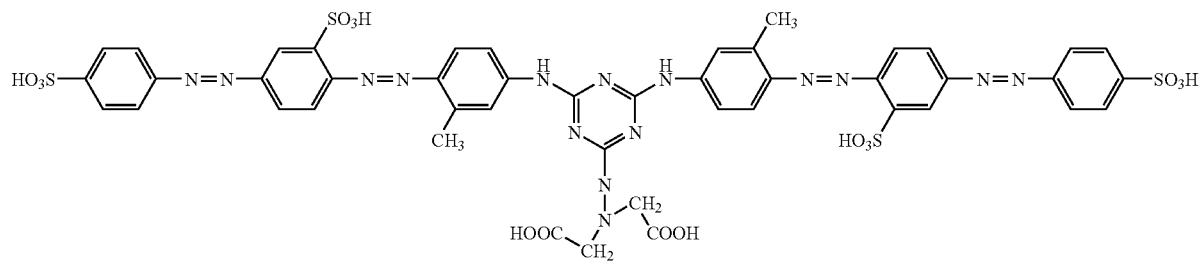

EXAMPLES 3 to 4

(A) Preparation of Ink

An ink composition was prepared by mixing the following components, and filtered through a 0.45 μm membrane filter, to obtain a water-based ink composition for inkjet of the present invention. This ink was of brown hue. Also, for water, ion-exchanged water was used. In addition, water and ammonium hydroxide were added to maintain within pH8 to 9 of the ink composition.

TABLE 2

| | |
|---|---|
| Each compound obtained in the above Examples (desalinated compounds were used) | 5.0 parts |
| Glycerin | 5.0 parts |
| Urea | 5.0 parts |
| N-Methyl-2-pyrrolidone | 4.0 parts |
| Isopropyl alcohol | 3.0 parts |
| Butylcarbitol | 2.0 parts |
| Surfactant (Surfinol 105 made by Nisshin Chemical Industry Co., Ltd.) | 0.1 parts |
| Water + ammonium hydroxide | 75.9 parts |
| Total | 100.0 parts |

In Table 2, "Each compound obtained in the above Examples" means that the compound of the formula (11) in Example 3 and the compound of the formula (12) in Example 4 were used, respectively. These water-based ink compositions did not give rise to separation by precipitation during storage, and did not show separation by precipitation nor change in physical properties such as viscosity even after storage for a long period of time.

(B) Inkjet Printing

Using each ink composition obtained as described above, inkjet recording was carried out with an inkjet printer (trade name BJ-S630 made by Canon Inc.) on 2 kinds of papers of a plain paper (LBP PAPER LS-500, made by Canon Inc.) and a special glossy paper PM (PM Photo Paper (glossy) KA420PSK, made by Seiko Epson Corp.).

In the printing, each ink were refilled in the ink cartridge for black color, and image pattern was designed so as to give several steps of tones in reflection density, to obtain half tone prints. Since a gray scale mode was used in this printing, each recording liquid of yellow, cyan or magenta other than the test recording liquid was not printed in the light-colored parts. Among the test method described below, bronzing property was evaluated by surface observation on the printed part in the maximum density. In measuring light fastness and ozone gas fastness which were evaluation items to be evaluated using a colorimetric instrument, a part of gradation showing a reflection density D value closest to 1.0 in the print before the test was used for the measurement.

(a) Ejection Property

An ink was loaded on the inkjet printer (BJ-S630 made by Canon Inc., head was thermal type), and it was evaluated how many sheets of plain paper can be printed continuously and stably. Printing was carried out using a pattern composed of 50% of solid area in 5 columns. Evaluation was made according to the following criteria. The results are shown in Table 3.

○: 10 or more sheets of A4 sized plain paper can be printed without any problem;

Δ: 10 sheets of A4 sized plain paper can be printed but with partly thin spots;

X: When 1 to 2 sheets of A4 sized plain paper are printed, thin spots appear on the sheets.

(C) Evaluation of Recorded Images

Using the recorded images printed with the water-based ink composition of the present invention, 3 items of bronzing, residual rate of density after light fastness test and residual rate of density after ozone gas fastness were evaluated. In this connection, evaluation of bronzing property and ozone gas fastness test were carried out only on the special glossy paper PM. The results are shown in Table 3. Test method is as given below.

(b) Bronzing Property

Evaluation was made using special glossy paper by surface observation on the part of the maximum density according to the following criteria.

○: printed part exhibits the glossy state similar to that of non-printed part,

Δ: glossy state of printed part is considerably deteriorated in comparison with that of non-printed part, X: Printed part expresses metallic glare with no gloss.

(c) Light Fastness Test

Using a Xenon Weather-O-Meter Ci4000 (made by ATLAS ELECTRIC DEVICES CO.), the printed samples were irradiated for 50 hours at an illumination intensity of 0.36 W/m$^2$. After finishing the test, residual rate of density after test was measured using a colorimetric instrument as described above. Rating was made according to the following criteria.

○: residual rate is not less than 95%;

Δ: residual rate is not less than 90% and less than 95%;

X: residual rate is less than 90%.

(d) Ozone Gas Fastness Test

Using an Ozone Weather-O-Meter (made by Suga Test Instruments Co., Ltd.), the test samples were left to stand in an atmosphere of ozone concentration: 40 ppm, humidity: 60% RH, and temperature: 24° C., for 6 hours. After finishing the test, residual rate of density after test was measured using the above colorimetric system. Rating was made according to the following criteria.

○: residual rate after 6 hour testing period is not less than 85%;

Δ: residual rate after 6 hour testing period is not less than 70% and less than 85%;

X: residual rate after 6 hour testing period is less than 70%.

COMPARATIVE EXAMPLE 1

For comparison, an ink composition was prepared in the same composition as in Examples 3 and 4 except that a compound of the above formula (3) produced by the method described in Patent Literature 1 was used as a water soluble coloring matter for inkjet instead of the compound of the formula (11) or the formula (12) in Example 3 or 4, respectively, and inkjet printing was carried out in the same manner as in Examples 3 and 4, to evaluate the ink composition. The results of ejection property on inkjet printer, and bronzing, light fastness evaluation and ozone gas fastness evaluation on the resultant recorded images are shown in Table 3.

TABLE 3

|  | Ejection property | Bronzing | Light fastness | Ozone gas fastness |
| --- | --- | --- | --- | --- |
| Example 3 (formula (11)) | ○ | — | — | — |
| Plain paper | — | — | X | — |
| Special glossy paper PM | — | ○ | ○ | ○ |
| Example 4 (formula (12)) | ○ | — | — | — |

TABLE 3-continued

|  | Ejection property | Bronzing | Light fastness | Ozone gas fastness |
| --- | --- | --- | --- | --- |
| Plain paper | — | — | X | — |
| Special glossy paper PM | — | ○ | Δ | ○ |
| Comparative Example (formula (3)) | X | — | — | — |
| Plain paper | — | — | X | — |
| Special glossy paper PM | — | X | Δ | ○ |

From Table 3, it is found that the ink composition of Comparative Example 1 is extremely bad in ejection property on a printer having a thermal head and gives rise to bronzing with the glossy paper, whereas those of Example 3 (the compound of the formula (11) in Example 1) and Example 4 (the compound of the formula (12) in Example 2) are good in ejection property and do not give rise to bronzing. Further, it is also found that the ink compositions of Examples 3 and 4 maintain good light fastness and ozone gas fastness in comparison with that of Comparative Example 1.

Since the compounds of Examples 1 (formula (11)) and 2 (formula (12)) are good in ejection property and do not give rise to bronzing, when these compounds are blended with a coloring matter for black color to prepare an ink composition for black color, a ratio of the azo compound of the present invention can be increased, thus, a range of selection for a coloring matter for black color which can be used is expected to be widened.

INDUSTRIAL APPLICABILITY

The ink composition containing the azo compound of the present invention can be used as an ink liquid for inkjet recording and for writing instrument.

What is claimed is:

1. An azo compound represented by the following formula (1):

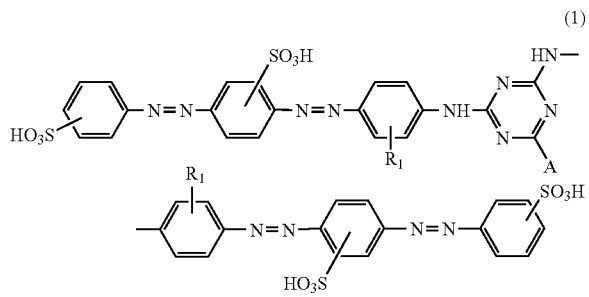

(wherein, in the formula (1), $R_1$, represents a hydrogen atom; a hydroxyl group; a carboxyl group; a ($C_1$-$C_4$)alkyl group which may be substituted by a hydroxyl group or a ($C_1$-$C_4$) alkoxy group; a ($C_1$-$C_4$)alkoxy group which may be substituted by a hydroxyl group or a ($C_1$-$C_4$)alkoxy group; a ($C_1$-$C_4$)alkylamino group which may be substituted by a hydroxyl group or a ($C_1$-$C_4$)alkoxy group; a carboxy($C_1$-$C_5$)alkylamino group; a bis{carboxy($C_1$-$C_5$)alkyl}amino group; a ($C_1$-$C_4$)alkanoylamino group which may be substituted by a hydroxyl group or a ($C_1$-$C_4$)alkoxy group; a phenylamino group which may be substituted by a carboxyl group, a sulfonic acid group or an amino group; a sulfo group; a halogen atom; or a ureide group, and A represents an aliphatic amine residue having a carboxyl group or a sulfo group, respectively;

or a salt thereof.

2. The azo compound or a salt thereof according to claim 1 represented by the following formula (2):

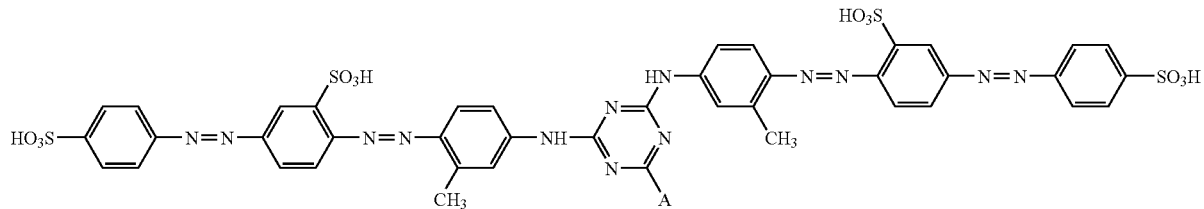

(2)

wherein, in the formula (2), A represents the same meaning as in the formula (1).

3. The azo compound or a salt thereof according to claim 1 or 2, wherein, in the formula (1) in claim 1 or in the formula (2) in claim 2, A is a mono($C_1$-$C_5$)alkylamino group or a di($C_1$-$C_5$)alkylamino group which has a carboxyl group or a sulfo group.

4. The azo compound or a salt thereof according to claim 1 or 2, wherein, in the formula (1) in claim 1 or in the formula (2) in claim 2, A is a mono($C_1$-$C_2$)alkylamino group or a di($C_1$-$C_2$)alkylamino group which has a carboxyl group or a sulfo group.

5. The azo compound or a salt thereof according to claim 2, wherein A in the formula (2) is a sulfoethylamino group.

6. The azo compound or a salt thereof according to claim 2, wherein A in the formula (2) is a group selected from the group consisting of a mono- or di(carboxymethyl)amino group and a mono- or di(carboxyethyl)amino group.

7. An ink composition comprising an azo compound or salts thereof according to claims 1 or 2.

8. An ink composition according to claim 7, further comprising and a coloring matter for black color.

9. The ink composition according to claim 7, comprising a water-soluble organic solvent.

10. The ink composition according to any one of claims 7 to 9, wherein the ink composition is for inkjet recording.

11. An inkjet recording method comprising ejecting an ink drop responding to a recording signal onto a record-receiving material wherein the ink comprises an ink composition comprising the azo compound according to claim 1.

12. The inkjet recording method according to claim 11, wherein the record-receiving material is a sheet for communication.

13. The inkjet recording method according to claim 12, wherein the sheet for communication comprises a porous white inorganic substance.

14. An inkjet printer loaded with a container containing the ink composition which comprises the azo compound according to claim 1.

15. A colored object colored with an azo compound or salt thereof according to claims 1 to 2.

16. An ink composition comprising the azo compounds or salts thereof according to claim 1 or 2 wherein, in the formula (1) and in the formula (2), A is selected from the group consisting of a mono($C_1$-$C_5$) alkylamino group or a di ($C_1$-$C_5$) alkylamino group which has a carboxyl group or a sulfo group, and a mono ($C_1$-$C_2$) alkylamino group or a di($C_1$-$C_2$) alkylamino group which has a carboxyl group or a sulfo group.

17. An ink composition comprising the azo compounds or salts thereof according to claim 5 or 6.

18. An ink composition according to claim 16, further comprising a coloring matter for black color.

19. An ink composition according to claim 17, further comprising a coloring matter for black color.

20. A colored object colored with an azo compound or salt thereof according to claim 1 or 2, wherein in the formula (1) and in the formula (2), A is selected from the group consisting of a mono($C_1$-$C_5$) alkylamino group or a di ($C_1$-$C_5$) alkylamino group which has a carboxyl group or a sulfo group, and a mono ($C_1$-$C_2$) alkylamino group or a di($C_1$-$C_2$) alkylamino group which has a carboxyl group or a sulfo group.

21. A colored object colored with an azo compound or salts thereof according to claim 5 or 6.

\* \* \* \* \*